United States Patent [19]

Blackstone

[11] 4,409,781

[45] Oct. 18, 1983

[54] THATCHING TOOL FOR ROTARY LAWN MOWER

[75] Inventor: George H. Blackstone, Toledo, Ohio
[73] Assignee: Arnold Industries, Inc., Toledo, Ohio
[21] Appl. No.: 289,308
[22] Filed: Aug. 3, 1981
[51] Int. Cl.³ ............................................ A01D 55/18
[52] U.S. Cl. ........................................ 56/295; 56/400
[58] Field of Search ..................... 56/400, 295; 172/42, 172/271

[56] References Cited

U.S. PATENT DOCUMENTS

| 412,540 | 10/1889 | Price | 172/271 |
|---|---|---|---|
| 523,597 | 7/1894 | Ryder | 172/271 |
| 3,611,691 | 10/1971 | Howard | 56/295 |
| 3,710,872 | 1/1973 | Kovar | 56/400 |
| 3,753,338 | 8/1973 | Sherratt | 56/295 |
| 3,765,159 | 10/1973 | Neff | 56/400 |
| 3,916,607 | 11/1975 | Howard | 56/295 |
| 3,964,243 | 6/1976 | Knipe | 56/295 |
| 4,078,367 | 3/1978 | Wessel | 56/400 |
| 4,145,866 | 3/1919 | Zweegers | 56/400 |
| 4,306,407 | 12/1981 | Dambroth | 56/295 |

Primary Examiner—Paul J. Hirsch
Attorney, Agent, or Firm—Allen D. Gutchess, Jr.

[57] ABSTRACT

A thatching tool for a rotary lawn mower is provided. The tool includes a rotatable supporting bar to be rotated by a motor of the mower with the bar having thatching teeth mounted at both ends. Each of the thatching teeth includes a horizontal coil portion having an attaching portion at one end and a ground-engaging portion of tooth member at the other end. The tooth member extends at an angle of 130°–160°, and preferably 140°–150°, to the direction of rotation. The end of the tooth member is bent downwardly substantially perpendicular to the ground, with the length of the bent portion being from one-tenth to one-third, and preferably one-sixth to one-fourth, of the overall length of the tooth member, including the bent portion. This configuration provides greater resiliency for the tooth and prevents undue digging into the ground. The tooth also has a weakened portion which is designed to break first if the tooth fatigues and is positioned to prevent the broken portion of the tooth from being thrown outwardly and possibly causing injury.

4 Claims, 3 Drawing Figures

THATCHING TOOL FOR ROTARY LAWN MOWER

This invention relates to a thatching tool for a rotary lawn mower.

Thatching tools ae now well known for use with rotary lawn mowers for removing dead grass from the lawn in the spring. Heretofore, the thatching teeth extended from the supporting bar of the mower straight downwardly or rearwardly at only a slight angle. This configuration provided a substantial penetrating action of the tooth into the ground but this action sometimes was excessive and caused damage to the lawn as well as removing dead grass.

The present invention provides an improved thatching tool for a rotary lawn mower which has teeth mounted on the end. Each of the teeth has an intermediate coil spring portion mounted on a shank of the supporting bar with the inner end having an attaching portion extending therefrom to be bolted or otherwise suitably fastened to the supporting bar. The outer end of the coil spring has a tooth member or ground-engaging portion extending downwardly therefrom. This tooth member is positioned to extend rearwardly in the direction opposite the direction of rotation of the supporting bar with the angle between the tooth member and the direction of rotation being from 130° to 160° and preferably from 140° to 150°. The lower end of the tooth member has a bent portion extending substantially perpendicularly to the ground with the bent portion being from about one-tenth to about one-third of the overall length of the tooth member and preferably about one-sixth to about one-fourth of the overall length. This configuration enables the bent portion to provide a penetrating force into the ground but, with this bent portion being substantially to the rear of the cutter bar and the coil spring, due to the angle of the tooth member, greater resiliency is provided so that undue penetration and harm to the lawn will not result.

The angle of the tooth member also enables the rotary lawn mower to be adjusted to a position closer to the ground to reduce the possibility of foreign objects or debris being thrown outwardly and causing injury.

Each of the teeth also has a notch or weakened portion located at the juncture of the coil portion and the attaching portion. This weakened portion is designed to fail first. Consequently, if failure occurs, the coil portion simply remains on the shank on which it is mounted with the ground-engaging portion or tooth member then trailing to the rear without penetrating the ground. The operator then knows the tooth has failed and can replace it. Heretofore, thatching teeth have often failed at the point where the ground-engaging portion of the tooth member joins the outer end of the coil portion. The tooth member then can be thrown outwardly and possibly cause injury.

It is, therefore, a principal object of the invention to provide an improved thatching tool for a rotary lawn mower.

Another object of the invention is to provide a thatching tooth which has a ground-engaging portion or tooth member extending rearwardly at a substantial angle to the direction of rotation of the tooth.

A further object of the invention is to provide a thatching tooth having a tooth member extending rearwardly from the direction of rotation and having a lower bent portion positioned substantially perpendicularly to the ground.

Yet another object of the invention is to provide a thatching tooth for a rotary lawn mower having a weakened portion positioned to prevent the tooth from flying off the supporting bar in the event of failure of the tooth.

Many other objects and advantages of the invention will be apparent from the following detailed description of a preferred embodiment thereof, reference being made to the accompanying drawings, in which.

Figure 1:
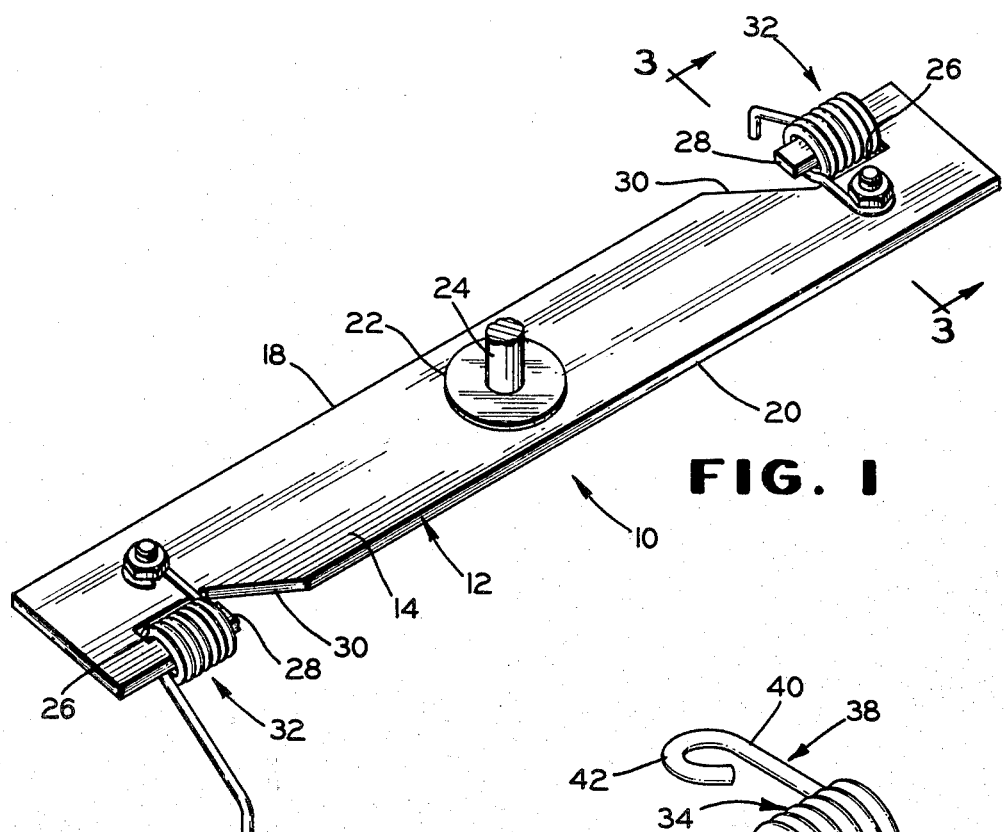
FIG. 1 is a somewhat schematic view in perspective of a thatching tool embodying the invention and mounted on a motor shaft.
Figure 2:
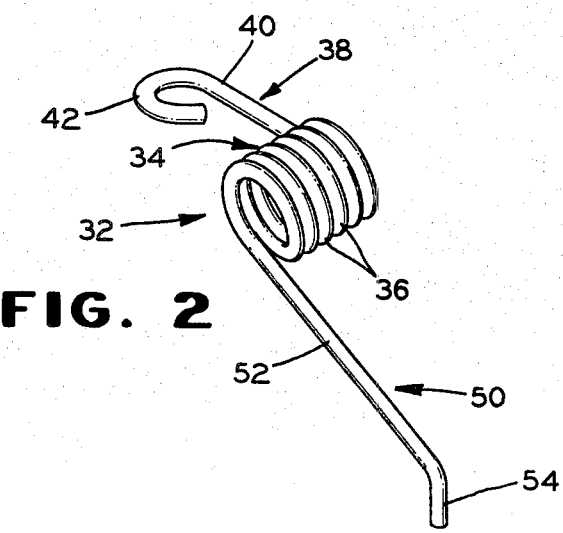
FIG. 2 is a view in perspective of a thatching tooth of the tool of FIG. 1.

Referring to the drawings, a thatching tool in accordance with the invention is indicated at 10 and includes a supporting bar 12 of generally rectangular shape with upper and lower, generally horizontal surfaces 14 and 16 and generally parallel longitudinal edges 18 and 20. A central portion of the supporting bar 12 has an opening (not shown) with fastening means including a washer 22 mounting the central portion of the bar on the lower end of a motor drive shaft 24 of a rotary lawn mower. Each of the outer end portions of the supporting bar 12 has a generally rectangular notch 26 near the trailing edge thereof forming a shank 28 at the trailing edge with the notch 26 terminating at a slanted edge 30.

A thatching tooth 32 is mounted at each outer end of the supporting bar 12. The tooth 32 includes an intermediate, resilient coil portion 34 having a plurality of coils 36 disposed in contiguous relationship in a horizontal direction. The coils have diameters sufficient to be received on the bar shank 28 with part of the coil portion in the notch 26 and another part located beyond the trailing edge of the shank 28. An attaching portion 38 extends substantially radially-outwardly from the coil portion 34 at the inner end thereof and includes a straight portion 40 and a loop 42.

A bolt 44 extends upwardly through a square bolt hole (not shown) in the supporting bar and through the loop 42 where it receives a lock washer 46 and a nut 48.

A tooth member or ground-engaging portion 50 of the tooth 32 extends tangentially from the outer end of the coil portion 34 at a trailing angle well to the rear of the supporting bar 12. The tooth member 50 has a straight portion 52 and a bent portion 54 at its lower end, with the straight portion 52 forming at an angle of 130° to 160°, and preferably 140° to 150°, to the direction of rotation of the supporting bar 12 and to the attaching means 38. The bent portion 54 is positioned substantially perpendicularly to the ground and has a length from about one-tenth to one-third and preferably from about one-sixth to one-fourth the overall length of the tooth member 50.

This unique configuration of the tooth member 50 enables the bent portion 54 to penetrate the ground sufficiently with its perpendicular disposition and yet with the bent portion 54 being substantially rearwardly of the coil portion 34, greater resiliency in the tooth member is achieved to enable the tooth member to yield more fully and prevent undue damage to the lawn, particularly when rough or uneven. In addition, the angular position of the tooth member enables the supporting bar 12 to be set closer to the ground so that the mower deck or housing can also be set closer. This reduces the possibility of debris or other foreign objects being thrown outwardly beneath the deck or housing and causing damage.

Figure 3:
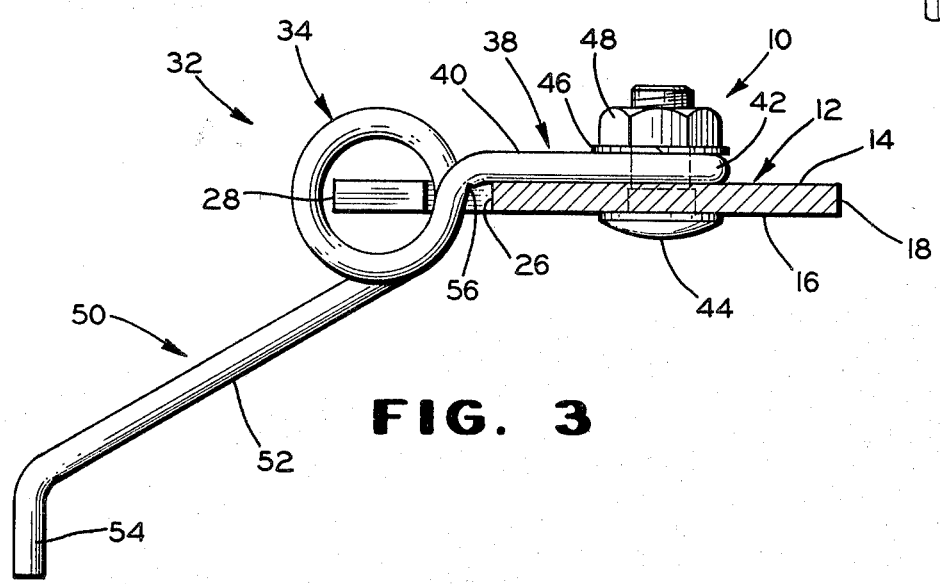
FIG. 3 is an enlarged view in transverse cross section taken along the line 3—3 of FIG. 1.

Heretofore, with thatching teeth of this general design, if the tooth would fatigue and break, the break would occur at either end of the coil portion 34. When this occured at the outer end, the tooth member 50 would sometimes be thrown outwardly from the mower and present the possibility of injury. However, the tooth 32 is provided with a weakened portion or notch 56 (FIG. 3) which is designed to break first. In the event of such breakage, the coil portion 34 remains on the shank 28 due to centrifugal force and the tooth member 50 then simply flops up and down behind the coil, no longer penetrating the ground. This gives the mower operator warning that a failure has occurred so that he can shut off the mower and replace the broken tooth. Thus all portions of the tooth remain on the supporting bar and none can be thrown out.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In combination, an elongated supporting bar having central means to be engaged by a drive shaft of a motor of a rotary power lawn mower, said bar having an elongate notch extending parallel to the trailing edge at each end of said bar, said notch terminating in a slanted edge extending from the side of said notch away from the trailing edge to the trailing edge of the bar and forming a shank at the trailing edge extending toward said central means, a thatching tooth at each end of said supporting bar, each of said teeth having a resilient coil portion received over the corresponding shank, attaching means at one end of said coil portion to be attached to said supporting bar, and a ground-engaging portion at the other end of said coil portion extending downwardly from said supporting bar at an angle of 130°–160° to the direction of rotation of said bar, said attaching means comprising a straight end portion extending from said coil portion, and said tooth having a weakened portion in the form of a notch where said coil portion and said straight portion meet.

2. The combination according to claim 1 characterized by said one end of said coil portion being closer to said central means than said other end of said coil portion.

3. A generally horizontal lawn-raking tool adapted to be removably attached to a powered vertical, rotatable shaft of a rotary-type lawn mower that includes a powered vertical, rotatable shaft, whereby said lawn-raking tool is adapted to rotate in a substantially horizontal plane about the vertical axis of such shaft, said lawn-raking tool comprising a substantially horizontal, elongated supporting bar having upper and lower generally parallel surfaces and two generally parallel edges, at least at end portions of said bar, said bar having a shank at each end portion of said bar and extending away from the corresponding end thereof, a thatching tooth at each end portion of said supporting bar, each tooth having a resilient coil portion received over the corresponding shank, said tooth having an outwardly-extending portion extending outwardly from one end of said coil portion in the direction of rotation of said bar, and a ground-engaging portion at the other end of said coil portion extending downwardly from said supporting bar, fastener means for attaching said outwardly-extending portion of each of said teeth to said bar, and each of said teeth having a weakened portion where said coil portion and said outwardly-extending portion meet, whereby failure of each of said teeth will tend to occur at said weakened portion and the resulting detached coil portion will remain on the shank.

4. A lawn raking tool according to claim 3 characterized by said weakened portion being a notch in said tooth.

* * * * *